Patented Aug. 7, 1928.

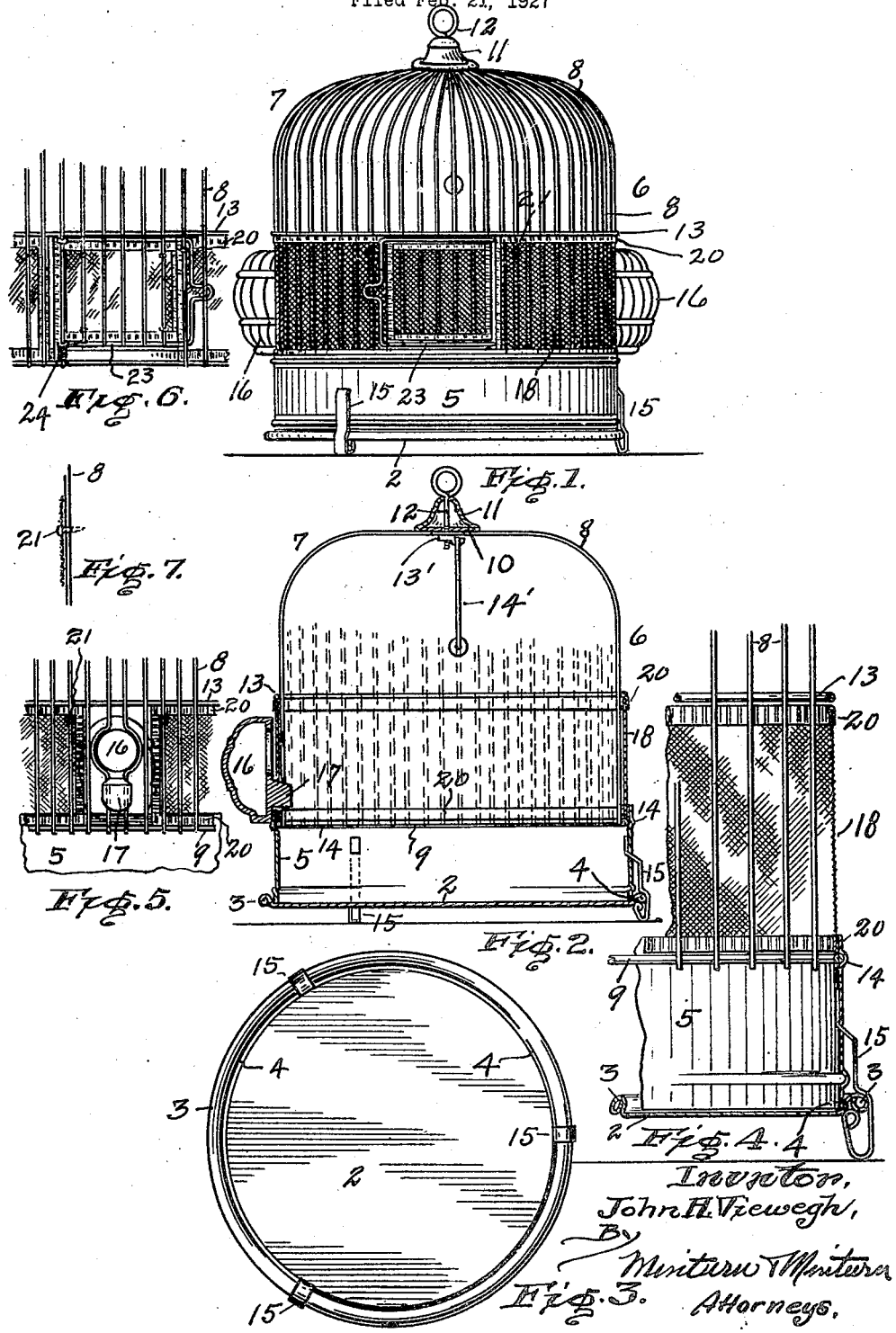

1,680,184

UNITED STATES PATENT OFFICE.

JOHN H. VIEWEGH, OF INDIANAPOLIS, INDIANA.

BIRD CAGE.

Application filed February 21, 1927. Serial No. 169,733.

The object of this invention is to produce a bird cage of handsome appearance which is strong and durable; which is readily accessible for the supply of food and water and for cleaning; which is inexpensive to manufacture, and which prevents the birds from scattering seed, water and refuse matter through the bars to the outside of the cage.

I accomplish the above and other objects which will hereinafter appear, by the means illustrated in the accompanying drawing, in which—

Fig. 1, is a view in front elevation of a bird cage embodying my invention;

Fig. 2, is a vertical central section of same on a plane through the place for the seed cups on each side shown in Fig. 1;

Fig. 3, is an under side plan view of the invention;

Fig. 4, is a detail in vertical section on a larger scale of parts shown in Fig. 2;

Fig. 5, is a detail, viewed from the inside of the cage, of a seed cup and associated parts of the cage;

Fig. 6, is a like view of the door of the cage and associated parts; and

Fig. 7, is a detail of the clip used in securing the wire cloth screens to the wire bars of the cage.

Like characters of reference indicate like parts in the several views of the drawing.

The cage here shown is cylindrical, but other shapes may be used without departing from the intent and spirit of this invention.

The bottom 2 is formed of sheet metal with an edge-roll 3 projecting on its upper side to form a cup-like recess into which the walls of the cage are seated. This edge-roll 3 may be a wired edge or an imitation wire roll, in either case there being an annular channel or groove 4 between the roll and the level bottom area.

The main body of the cage comprises a tight sheet metal side portion 5 formed into a continuous band and a side superstructure 6 and top 7 formed out of wires 8 spaced apart and bent as shown. These are spot-welded at their lower ends to the inner side of an outside encircling wire band 9, thereby spacing the wires from the metal sides 5 and at their upper ends to the metal base plate 10 of a cap 11. The stem of an eyebolt 12 passes through the cap 11 and plate 10; also through a nut 13' which has a hook by which the wire loop 14' of a perch swing is supported. At a suitable distance between band 9 and plate 10, here shown as about half way between them, is another outside encircling wire band 13, similar to band 9, to which the wires 8 are also spot-welded.

The sheet metal side portion 5 has an inside channel or corrugation 14, in which the lower wire band 9 is assembled and held.

The bottom 2 is removably secured to the sheet metal side member 5 by clips 15, here shown as three in number, but the number used is optional. These each comprises a strap of spring metal one end of which is passed through a slot in the side 5 and is spot-welded to the metal of said side member 5. The strap continues thence downwardly into contact with the edge roll 3 of the bottom 2 and for a distance below the bottom 2 to form feet that will suitably elevate the bottom of the cage from a table, window sill or the like on which it may at times be placed. The strap is then bent and continued upwardly and terminates with a roll which enters the groove 4, at the edge of the bottom 2. The engagement is such that the edge roll 3 of the bottom is gripped between portions of the clip with such tension as to require force to disengage the fastening and make accidental release improbable.

Cups 16, for seed or water, are preferably made out of glass and have lugs 17 with vertical side channels. A pair of wires on each side of the cage are oppositely bowed as shown in Fig. 5, to form an opening for the passage of the bird's head in reaching the contents of the cups, and through these enlargements the respective lugs 17 are passed and the cup is retained by pushing the lug down between the unbowed portions of the wire pair. The downward movement of the cups is limited by their contact with the outside bead in the sheet metal member 5, formed by the corrugation 14, in said member, best shown in Fig. 2.

To keep the birds from throwing seed and water through the walls of the cage, I place wire cloth screens 18 up from the solid sheet metal member 5 to the wire band 13, which is above the cups. These wire cloth screens are edged with metal strips 20, folded double with the edges of the wire cloth between them, and are retained by running the folded edges through a crimping roller, the crimping being represented by the short parallel lines in the drawing. This bending of the edges is necessary to keep the birds from impaling themselves on the wire ends of the cloth. The screens thus formed, are secured to the vertical wires by clips 21. The heads of the clips are soldered to the wire cloth and the stems are wrapped around the vertical or body wires and clinched together.

The door of the cage comprises a wire frame 23 to which short vertical wires are spot-welded and the latter are covered with a wire cloth screen in the same manner as above described for the rest of the cage. The door is automatically closed by a spring 24, see Fig. 6.

While I have here shown and described the best embodiment of my invention now known to me it is obvious that many changes in detail are possible without departing from its spirit and I therefore do not desire to be limited any more than is required by the appended claims.

I claim:

1. A bird cage having a top centrally located member the lower sides of the cage being formed of sheet metal having an annular corrugation near its upper edge and having a wire ring in said corrugation and the upper sides and top of the cage being formed out of wires which extend from the inner side of the wire ring in the corrugation to the top centrally located member to both of which the wires are fastened leaving a space between the wires of the top and sheet metal sides, and said cage having other spacing and fastening means for the wires of the side and top between the wire ring and top member, said cage also having a belt of woven wire above and next to the sheet metal side member sealed in the space between the metal side member and wires of the top.

2. In a bird cage, a side wall comprising a belt of sheet metal, a sheet metal bottom having an edge roll and an underside channel between the bottom and roll and a plurality of spring metal straps each having an end attached to the belt and extending below the bottom to form feet and having the other end of each strap engaged in the channel from which it releases by an outward pressure on the foot end of the straps.

3. In a bird cage, a side wall comprising a belt of sheet metal, a sheet metal bottom having an edge roll and an underside channel between the bottom and roll and a plurality of spring metal straps each having an end passed through a slot in the belt and there fixed to the inside of the belt said clips being extended down into contact with the roll and hence below the roll to form feet and thence up with the other end of each strap engaged in the channel from which it releases by an outward pressure on the foot end of the straps.

4. In a bird cage, a top plate, a metal belt next to the cage bottom having an annular channel near its top edge forming an outside bead, a wire ring in said channel, a plurality of spaced-apart wires secured to the ring and to the top plate and cups having lugs with side channels said lugs being impinged between a pair of said spaced-apart wires to secure the cups, the bottoms of the cups contacting the outer side of the metal belt and resting upon the bead of the metal belt to tighten and limit the downward movement of the cups.

In testimony whereof I affix my signature.

JOHN H. VIEWEGH.